(12) United States Patent
Mori et al.

(10) Patent No.: US 11,933,537 B2
(45) Date of Patent: Mar. 19, 2024

(54) REFRIGERATOR

(71) Applicant: Panasonic Intellectual Property Management Co., Ltd., Osaka (JP)

(72) Inventors: Kiyoshi Mori, Shiga (JP); Kei Nambu, Kyoto (JP); Tsuyoki Hirai, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 424 days.

(21) Appl. No.: 17/287,083

(22) PCT Filed: Aug. 6, 2019

(86) PCT No.: PCT/JP2019/030915
§ 371 (c)(1),
(2) Date: Apr. 20, 2021

(87) PCT Pub. No.: WO2020/084864
PCT Pub. Date: Apr. 30, 2020

(65) Prior Publication Data
US 2021/0389049 A1 Dec. 16, 2021

(30) Foreign Application Priority Data
Oct. 23, 2018 (JP) ................. 2018-199431

(51) Int. Cl.
*F25D 31/00* (2006.01)
*F25D 25/02* (2006.01)
(Continued)

(52) U.S. Cl.
CPC ......... *F25D 31/005* (2013.01); *F25D 25/025* (2013.01); *F25D 29/00* (2013.01);
(Continued)

(58) Field of Classification Search
CPC ...... F25D 31/005; F25D 25/025; F25D 29/00; F25D 2400/02; F25D 2600/04;
(Continued)

(56) References Cited

U.S. PATENT DOCUMENTS

2013/0160467 A1  6/2013 Hall et al.
2014/0305612 A1  10/2014 Celik et al.
(Continued)

FOREIGN PATENT DOCUMENTS

CN  106288626      1/2017
CN  106288626 A *  1/2017 ............... A23B 4/07
(Continued)

OTHER PUBLICATIONS

Office Action issued for Japanese Patent Application No. 2018-199433, dated Oct. 25, 2022, 18 pages including machine translation.
(Continued)

*Primary Examiner* — Emmanuel E Duke
(74) *Attorney, Agent, or Firm* — Hamre, Schumann, Mueller & Larson, P.C.

(57) ABSTRACT

A refrigerator includes a cooling/heating chamber capable of cooling and heating foods. The cooling/heating chamber is divided into a heating zone that is a space where foods to be heated are placed, and a non-heating zone that is a space continuous with the heating zone where foods not to be heated are placed. The refrigerator further includes an oscillation electrode and a counter electrode that are arranged so as to face each other with the heating zone in between, and an oscillating unit that applies an AC voltage to between the oscillation electrode and the counter electrode.

11 Claims, 15 Drawing Sheets

(51) Int. Cl.
*F25D 29/00* (2006.01)
*G01N 21/55* (2014.01)
*H05B 6/62* (2006.01)

(52) U.S. Cl.
CPC ............... *G01N 21/55* (2013.01); *H05B 6/62* (2013.01); *F25D 2400/02* (2013.01); *F25D 2600/04* (2013.01); *F25D 2700/121* (2013.01)

(58) Field of Classification Search
CPC ............ F25D 2700/121; F25D 17/045; F25D 17/065; F25D 2317/061; F25D 2317/0651; F25D 2317/0665; F25D 23/12; G01N 21/55; H05B 6/62; H05B 6/54; H05B 6/688; A23L 3/01; A23L 3/365
See application file for complete search history.

(56) References Cited

U.S. PATENT DOCUMENTS

2016/0286847 A1   10/2016  Villemaire et al.
2017/0071234 A1*   3/2017  Garg ..................... A23L 3/365

FOREIGN PATENT DOCUMENTS

| CN | 106387607 | | 2/2017 | | |
|---|---|---|---|---|---|
| CN | 207095130 U | | 3/2018 | | |
| EP | 3783283 | | 2/2021 | | |
| JP | S54-31961 U | | 3/1979 | | |
| JP | H3-217775 | | 9/1991 | | |
| JP | H5-1880 | | 1/1993 | | |
| JP | H6-323721 | | 11/1994 | | |
| JP | H9-250867 | | 9/1997 | | |
| JP | H1015083 A | * | 1/1998 | | |
| JP | 2002-147919 | | 5/2002 | | |
| JP | 2003-028563 | | 1/2003 | | |
| JP | 2005-351543 | | 12/2005 | | |
| JP | 2011-252635 | | 12/2011 | | |
| JP | 2013-72618 | | 4/2013 | | |
| JP | 2014-159896 | | 9/2014 | | |
| JP | 2017-182885 | | 10/2017 | | |
| JP | 2017182885 A | * | 10/2017 | ............... | H05B 6/62 |
| JP | 2018-004228 | | 1/2018 | | |
| KR | 20060039851 A | * | 5/2006 | ........ | H01J 37/32174 |
| WO | 2011/135865 | | 11/2011 | | |
| WO | WO-2011135865 A1 | * | 11/2011 | ............... | F25D 11/02 |
| WO | 2015/068127 | | 5/2015 | | |
| WO | 2020/084866 | | 4/2020 | | |

OTHER PUBLICATIONS

Office Action issued for Japanese Patent Application No. 2018-199433, dated Mar. 7, 2023, 8 pages including machine translation.
The extended European search report issued for European patent application No. 19875804.7, dated Dec. 2, 2021, 8 pages.
International Search Report of PCT/JP2019/030915, dated Oct. 15, 2019, 5 pages including English translation.
International Search Report of PCT/JP2019/030924, dated Oct. 1, 2019, 4 pages including English translation.
International Preliminary Report on Patentability of the corresponding International Application No. PCT/JP2019/030915, dated May 6, 2021, 17 pages including English translation.
International Preliminary Report on Patentability of the related International Application No. PCT/JP2019/030924, dated May 6, 2021, 23 pages including English translation.
Office Action and search report issued for Chinese Patent Application No. 201980069750.5, dated Jun. 7, 2022, 24 pages including machine translation and partial English translation.
Office Action and search report issued for Chinese Patent Application No. 201980069844.2, dated Jun. 8, 2022, 17 pages including machine translation and partial English translation.
Office Action issued for Japanese Patent Application No. 2018-199431, dated Jun. 28, 2022, 8 pages including machine translation.

* cited by examiner

REFRIGERATOR

TECHNICAL FIELD

The present invention relates to a refrigerator capable of thawing foods.

BACKGROUND ART

For example, Patent Document 1 discloses a freezer capable of thawing foods in a frozen state. The refrigerator of Patent Document 1 has a high-frequency heating chamber that contains foods to be thawed and that subjects the contained foods to high-frequency heating (dielectric heating). The high-frequency heating chamber is configured so that cold air from a freezing chamber can be introduced. As a result, the high-frequency heating chamber is used as the freezing chamber when not used for thawing.

PRIOR ART DOCUMENT

Patent Document

Patent Document 1: JP-A-2002-147919

SUMMARY OF THE INVENTION

Problem to be Solved by the Invention

In the case of the freezer described in Patent Document 1, however, when desiring to thaw some of multiple foods preserved frozen in the high-frequency heating chamber used as the freezing chamber, foods not desired to be thawed need to be moved from the high-frequency heating chamber.

It is therefore an object of the present invention, in a refrigerator including a cooling/heating chamber capable of cooling and heating foods, to heat foods in the cooling/heating chamber without moving foods other than the foods to be heated from the cooling/heating chamber.

Means for Solving Problem

To solve the above problem, according to an aspect of the present invention,
  there is provided a refrigerator having a cooling/heating chamber capable of cooling and heating foods,
  the cooling/heating chamber being divided into a heating zone that is a space where foods to be heated are placed, and a non-heating zone that is a space continuous with the heating zone where foods not to be heated are placed, the refrigerator including:
  an oscillation electrode and a counter electrode that are arranged so as to face each other with the heating zone in between, and
  an oscillating unit that applies an AC voltage to between the oscillation electrode and the counter electrode during execution of a zone heating operation.

Effect of the Invention

According to the present invention, it is possible, in the refrigerator including the cooling/heating chamber capable of cooling and heating foods, to heat foods in the cooling/heating chamber without moving foods other than the foods to be heated from the cooling/heating chamber.

BRIEF DESCRIPTION OF DRAWINGS

These aspects and features of the present invention will become apparent from the following description related to preferred embodiments about the accompanying drawings, in which.

MODES FOR CARRYING OUT THE INVENTION

Figure 1:
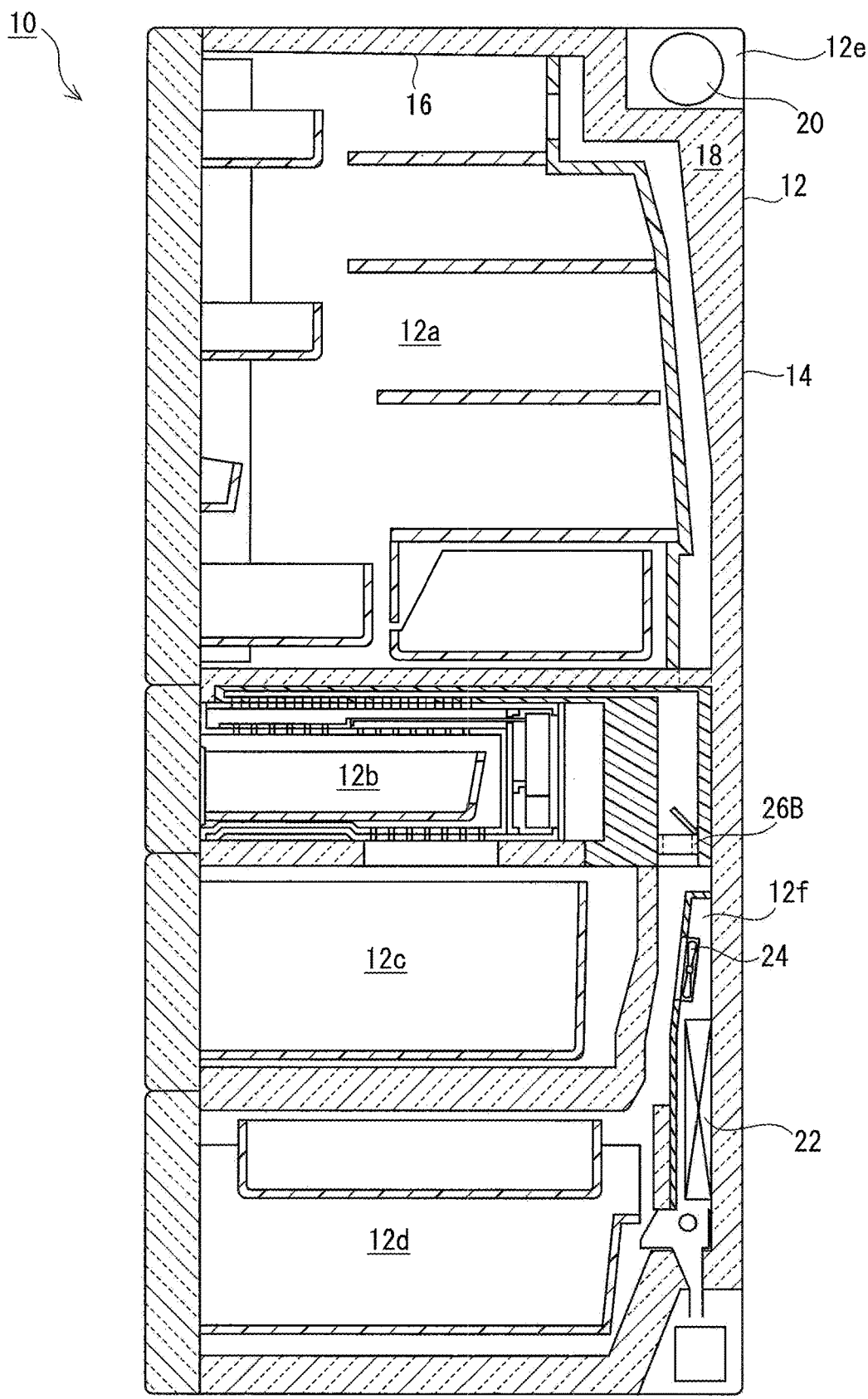
FIG. 1 is a longitudinal sectional view of a refrigerator of an embodiment according to the present invention.

A refrigerator according to an aspect of the present invention is a refrigerator having a cooling/heating chamber capable of cooling and heating foods, the cooling/heating chamber being divided into a heating zone that is a space where foods to be heated are placed, and a non-heating zone that is a space continuous with the heating zone where foods not to be heated are placed, the refrigerator including an oscillation electrode and a counter electrode that are arranged so as to face each other with the heating zone in between, and an oscillating unit that applies an AC voltage to between the oscillation electrode and the counter electrode during execution of a zone heating operation.

According to such an aspect, it is possible, in the refrigerator including the cooling/heating chamber capable of cooling and heating foods, to heat foods in the cooling/heating chamber without moving foods other than the foods to be heated from the cooling/heating chamber.

For example, the refrigerator may include an operating unit that receives a user's instruction to switch from a normal operation preserving the foods at a first cooling preservation temperature to the zone heating operation heating foods placed in the heating zone. This enables only foods placed in the heating zone to be heated.

For example, the oscillation electrode may have a cold air passage hole through which the cold air passes toward the cooling/heating chamber. This enables the oscillation electrode to be cooled.

For example, the refrigerator may include a drawer containing the foods that retreats from and enter the cooling/heating chamber, and a presenting unit that presents to a user that a portion of the drawer arranged in the heating zone is a place where foods to be heated are placed. As a result, foods to be heated can be placed in the heating zone by the user.

For example, the drawer may have, at least one of its bottom part and lateral wall part, a through hole extending through from the interior of the drawer toward the exterior. This enables cold air in the drawer to flow out smoothly to the exterior.

For example, the heating zone may be located in front of the refrigerator with respect to the non-heating zone. This enables foods heated in the heating zone to be removed immediately.

For example, the refrigerator includes: a compressor that circulates a refrigerant; a cooler through which the refrigerant passes; a cooling fan that blows cold air, which is air cooled by the cooler, toward the cooling/heating chamber; a damper that is disposed on a flow passage between the cooling/heating chamber and the cooling fan, for controlling a flow rate of cold air flowing into the cooling/heating chamber by opening and closing; and a temperature sensor that measures an internal temperature of the cooling/heating chamber. During the zone heating operation, the internal temperature of the cooling/heating chamber is maintained at the first cooling preservation temperature that is the temperature in the normal operation, by executing output control of the compressor, rotation speed control of the cooling fan, and opening/closing control of the damper, based on a result of measurement by the temperature sensor. As a result, foods not to be heated can be preserved frozen.

For example, the refrigerator includes: a reflected wave detecting unit that detects a reflected wave returning to the oscillating unit; and a reflectance calculating unit that calculates a reflectance which is a ratio of the reflected wave to an incident wave output from the oscillating unit. In this case, at a first timing where a reflectance lower than a first threshold value is calculated, the operation is switched from the normal operation to a quenching operation that more rapidly cools the cooling/heating chamber than during the normal operation. At a second timing after the start of the quenching operation where the reflectance reaches a second threshold value that is a value lower than the first threshold value, the oscillating unit starts to intermittently apply an AC voltage to between the oscillation electrode and the counter electrode. When a predetermined time elapses from a third timing after the oscillating unit starts to intermittently apply the AC voltage where the reflectance reaches a third threshold value that is a value lower than the second threshold value, the quenching operation terminates, with the result that the normal operation is resumed and the intermittent application of the AC voltage by the oscillating unit terminates. This enables foods contained in the cooling/heating chamber to be rapidly cooled automatically.

For example, when the compressor is operating during the normal operation, the oscillating unit may apply an AC voltage to between the oscillation electrode and the counter electrode. As a result, generation of frost can be suppressed.

The first cooling preservation temperature may be a freezing temperature.

Figure 2:
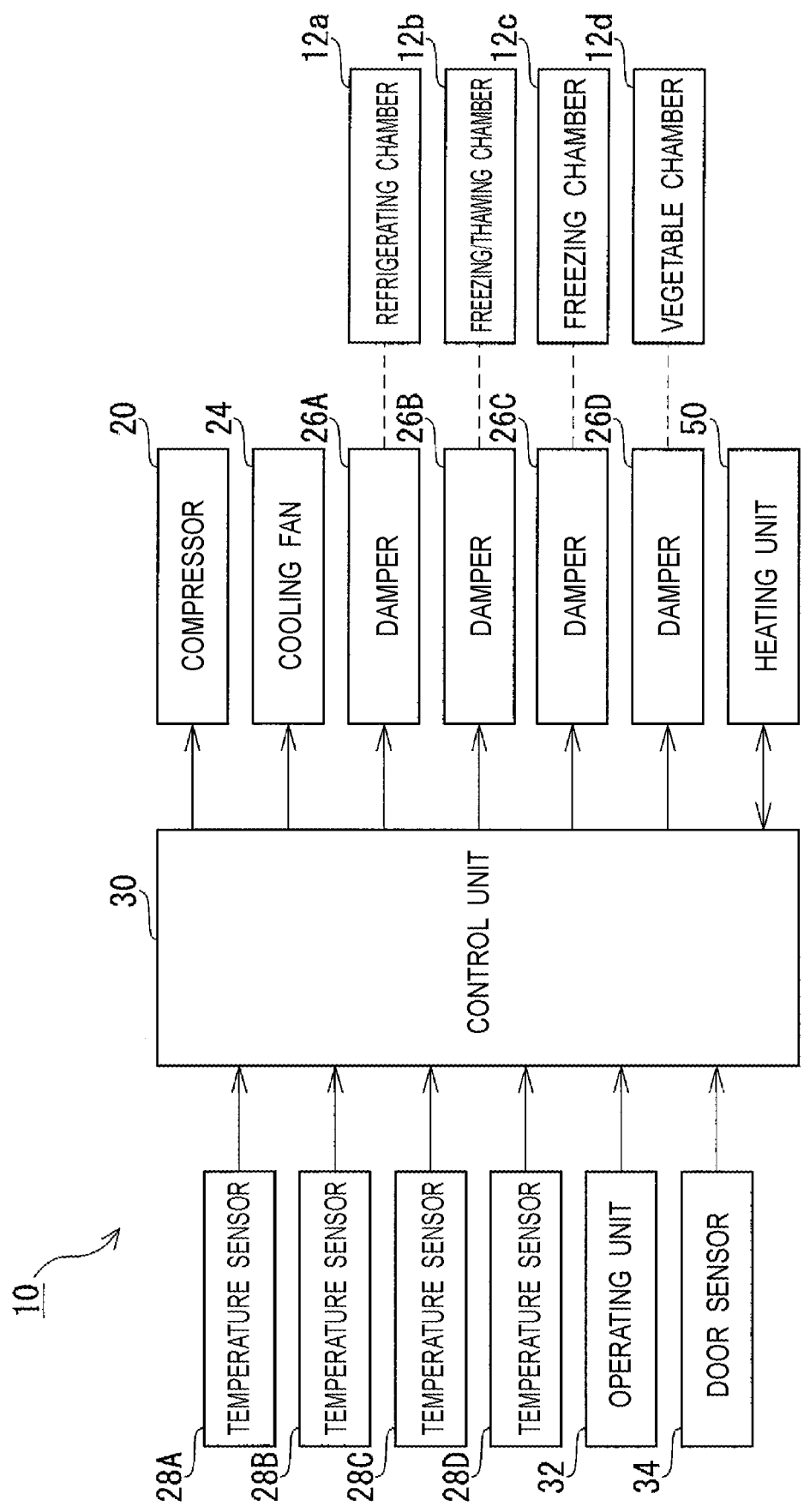
FIG. 2 is a block diagram showing a control system of the refrigerator.

Hereinafter, a refrigerator according to an embodiment of the present invention will be described with reference to the drawings. FIG. 1 is a longitudinal sectional view of the refrigerator of the present embodiment. In FIG. 1, the left side is a front surface side of the refrigerator, and the right side is a back surface side of the refrigerator. Further, FIG. 2 is a block diagram showing a control system of the refrigerator.

As shown in FIG. 1, a refrigerator 10 includes a main body 12. The main body 12 is configured from outer housing 14 made of a metal material that constitutes an outer surface of the refrigerator 10, an inner housing 16 made of a resin material such as ABS for example that constitutes an inner surface of the refrigerator 10, and an insulation material 18 such as hard urethane foam that is filled in a space between the outer housing 14 and the inner housing 16.

The main body 12 of the refrigerator 10 includes a plurality of storage chambers for storing foods (foodstuffs, processed foodstuffs, etc.). In the case of the present embodiment, the storage chambers include, from the top, a refrigerating chamber 12a, a freezing/thawing chamber 12b, a freezing chamber 12c, and a vegetable chamber 12d. Note that although not shown, an ice making chamber making ice is disposed on the right side (back side in the drawing) of the freezing/thawing chamber 12b. Further, the refrigerator 10 can also contain products other than foods.

The refrigerating chamber 12a is a space maintained in a temperature range where foods do not freeze, for example, in the temperature range of 1° C. to 5° C. The freezing chamber 12c is a space maintained in a temperature range where foods freeze, for example, in the temperature range of −22° C. to −15° C. The vegetable chamber 12d is a space maintained in a temperature range equal to or higher than that of the refrigerating chamber 12a, for example, in the temperature range of 2° C. to 7° C. The freezing/thawing chamber 12b will be described later.

In the case of the present embodiment, a machine chamber 12e is disposed on top of the main body 12 of the refrigerator 10. The machine chamber 12e houses a compressor 20, etc. that make up a freezing cycle of the refrigerator 10 and that circulate a refrigerant for the freezing cycle. Note that alternatively, the machine chamber 12e may be disposed at the bottom of the main body 12 of the refrigerator 10.

In the case of the present embodiment, a cooling chamber 12f is disposed on a back surface side of the freezing chamber 12c and the vegetable chamber 12d. In the cooling chamber 12f, a cooler 22 is arranged that makes up the freezing cycle of the refrigerator 10 and that allows the refrigerant to pass therethrough. Further, in the cooling chamber 12f, a cooling fan 24 is disposed that blows air (cold air) of the cooling chamber 12f cooled by the cooler 22 toward the refrigerating chamber 12a, the freezing/thawing chamber 12b, the freezing chamber 12c, and the vegetable chamber 12d. Furthermore, as shown in FIG. 2, dampers 26A to 26D for controlling the flow rate of cold air flowing into the chambers 12a to 12d are arranged on flow passages between the chambers 12a to 12d and the cooling fan 24 (only a damper 26B is shown in FIG. 1).

Moreover, as shown in FIG. 2, the refrigerating chamber 12a, the freezing/thawing chamber 12b, the freezing chamber 12c, and the vegetable chamber 12d include temperature sensors 28A to 28D, respectively, that measure their internal temperatures.

As shown in FIG. 2, based on the results of measurement of the plural temperature sensors 28A to 28D, a control unit 30 of the refrigerator 10 executes cooling control, that is, executes output control of the compressor 20, rotation speed control of the cooling fan 24, and opening/closing control of each of the dampers 26A to 26D, whereby the temperatures within the refrigerating chamber 12a, the freezing/thawing chamber 12b, the freezing chamber 12c, and the vegetable chamber 12d are properly kept. The control unit 30 is a substrate including a processor such as a CPU for example, a storage device storing programs, etc., and a circuit, and the processor controls the compressor 20, the cooling fan 24, and the dampers 26A to 26D in accordance with the programs stored in the storage device.

As shown in FIG. 2, in the case of the present embodiment, since the refrigerator 10 is operated by the user, the refrigerator 10 includes an operating unit 32 for operation thereof and particularly of the freezing/thawing chamber 12b. Note that the operating unit 32 may be a touch panel incorporated in the refrigerator 10 and/or a user's mobile terminal. In the case where the operating unit 32 is the mobile terminal, software (an application) for operating the refrigerator 10 is installed in the mobile terminal. Hereinafter, details of the freezing/thawing chamber 12b will be described.

Figure 3:
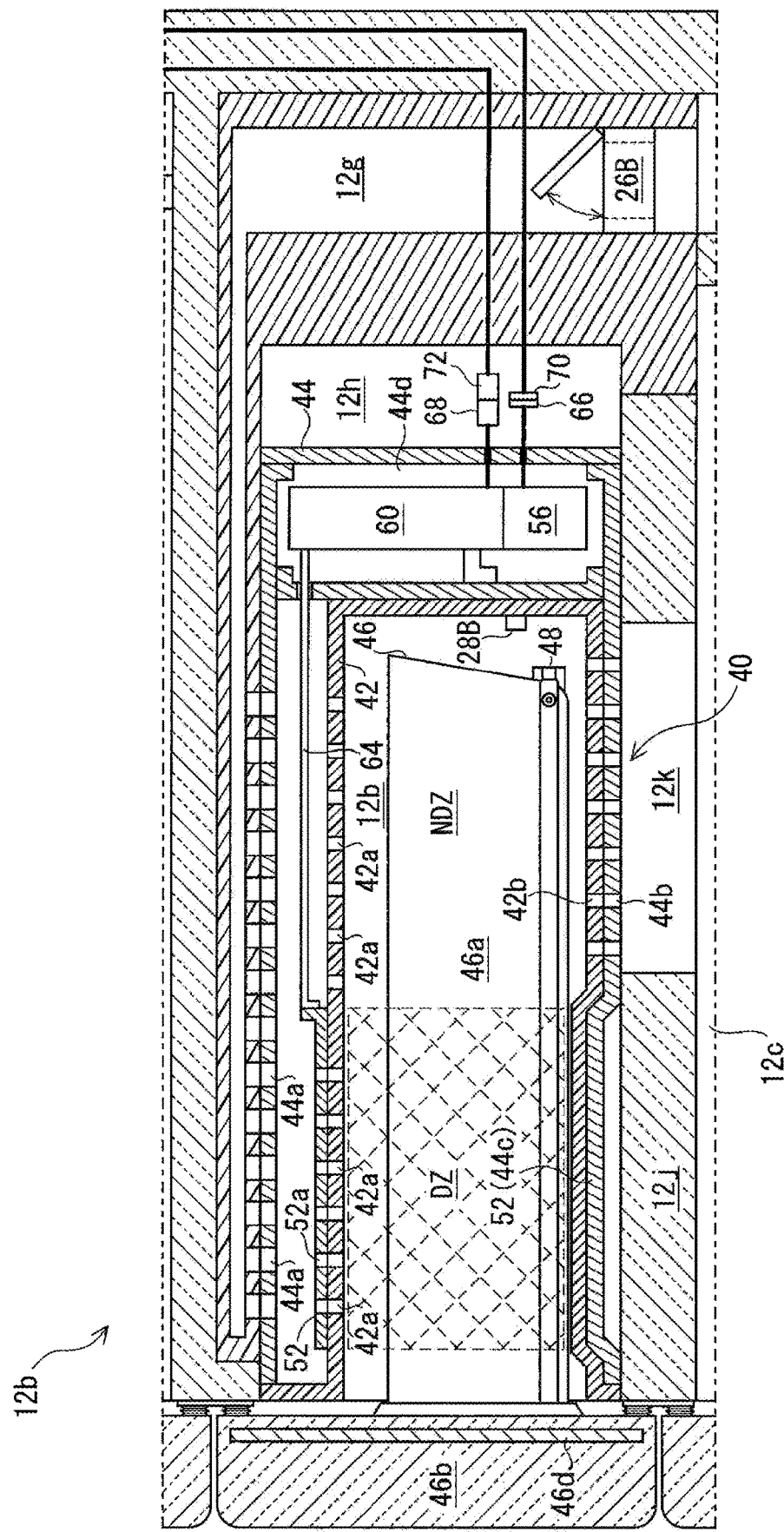
FIG. 3 is an enlarged sectional view of a freezing/thawing chamber.
Figure 4:
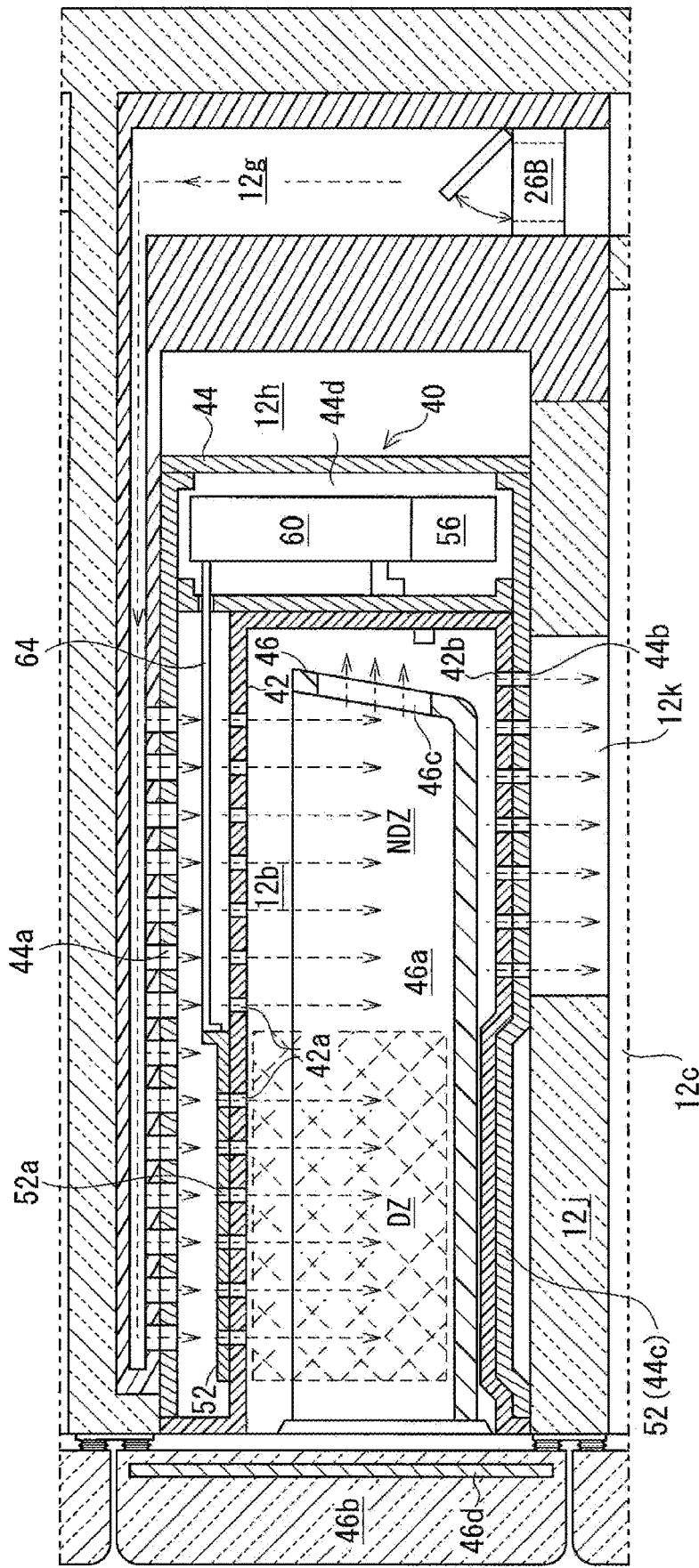
FIG. 4 is an enlarged sectional view of the freezing/thawing chamber showing the flow of cold air.

FIG. 3 is an enlarged sectional view of the freezing/thawing chamber 12. Further, FIG. 4 is an enlarged sectional view of the freezing/thawing chamber showing the flow of cold air. Note that the flow of cold air is indicated by an alternate long and short dashed line.

As shown in FIG. 3, in the case of the present embodiment, the freezing/thawing chamber 12b is configured by a heating module 40 incorporated in the main body 12 of the refrigerator 10.

Figure 5:
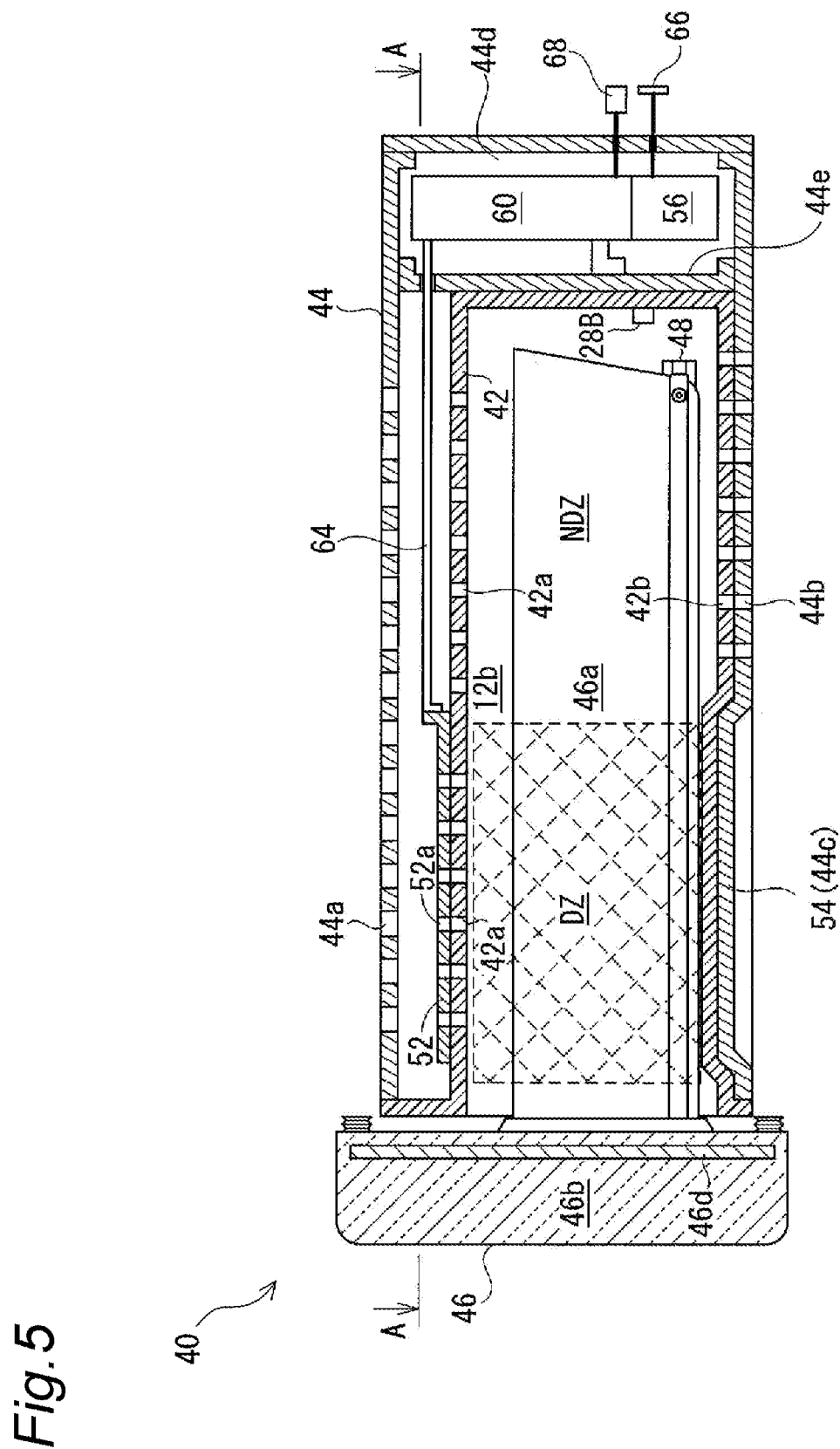
FIG. 5 is a sectional view of a heating module.
Figure 6:
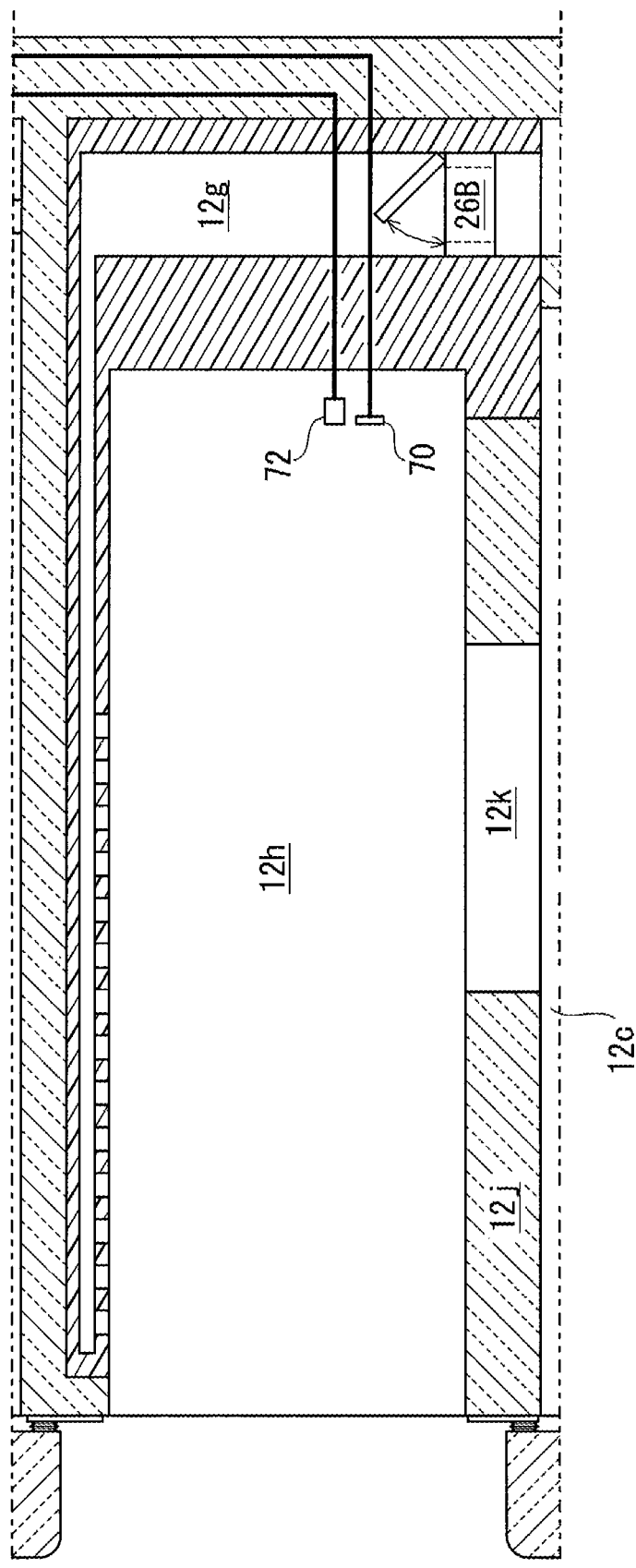
FIG. 6 is a sectional view of part of a main body of the refrigerator before incorporating the heating module.
Figure 7:
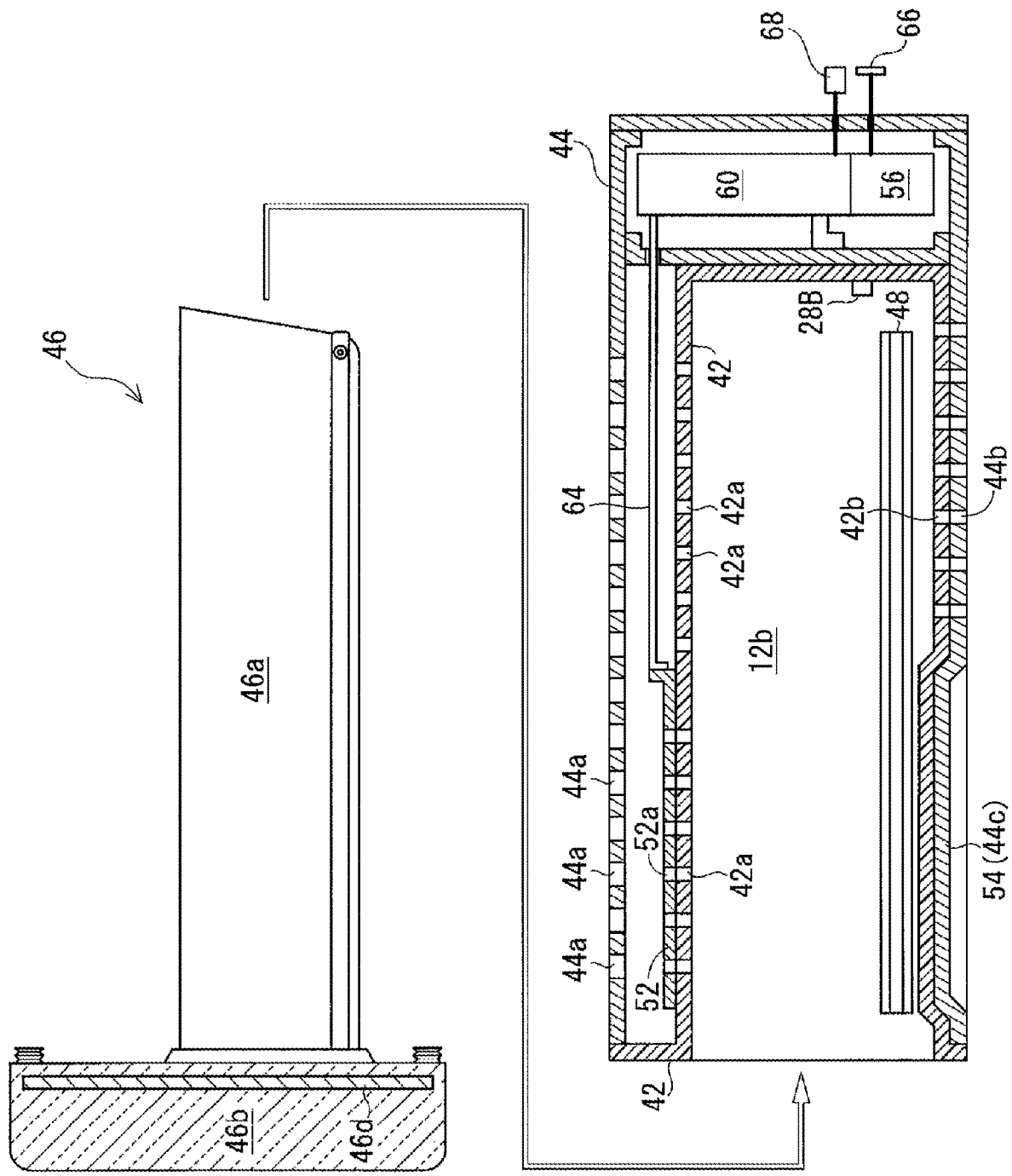
FIG. 7 is an exploded sectional view of the heating module.
Figure 8:
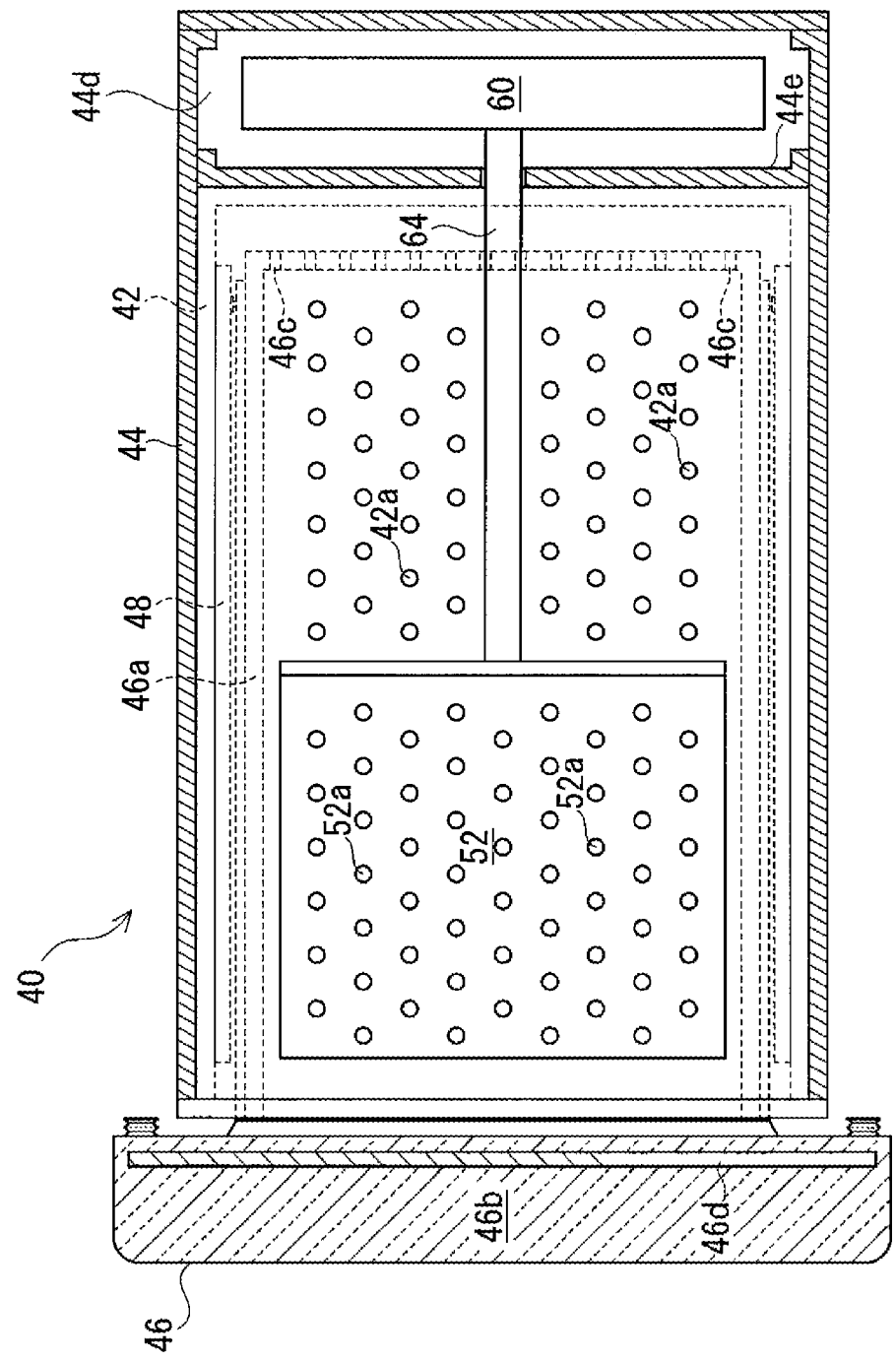
FIG. 8 is a sectional view of the heating module taken along line A-A of FIG. 5.

FIG. 5 is a sectional view of the heating module and FIG. 6 is a sectional view of part of the main body of the refrigerator before incorporating the heating module. FIG. 7 is an exploded sectional view of the heating module. FIG. 8 is a sectional view of the heating module taken along line A-A of FIG. 5.

As shown in FIGS. 5 and 8, the heating module 40 has a rectangular parallelepiped shape and is a double-walled structure including an inner case 42 and a shield case 44 containing the inner case 42. The shield case 44 functions as a housing of the heating module 40. The inner case 42 defines a containing chamber for containing foods, that is, the freezing/thawing chamber 12b.

The inner case 42 is made of an insulating material such as resin and has a box shape having an opening on the front side. The shield case 44 is configured of a material containing metal and is made of e.g. a metal material such as aluminum. Further, the shield case 44 has an opening on the front side and is in the shape of a box storing the inner case 42.

In the case of the present embodiment, as shown in FIG. 7, the heating module 40 includes a drawer 46 for containing foods that retreats from and enters the freezing/thawing chamber 12b. Specifically, the drawer 46 includes a containing part 46a for containing foods and a door part 46b disposed on the front side of the containing part 46a that opens and closes the freezing/thawing chamber 12b. The containing part 46a is made of a resin material. Further, metal rails 48 guiding the drawer 46 when sliding in and out are disposed on the inner wall surface of the inner case 42. Such a drawer 46 makes it easier to put/remove foods into/from the freezing/thawing chamber 12b.

In the case of the present embodiment, as shown in FIGS. 3 and 4, the heating module 40 has cold air inlet holes for introducing cold air (dashed line) into the freezing/thawing chamber 12b disposed thereinside and cold air outlet holes for discharging cold air in the freezing/thawing chamber 12b. Specifically, the cold air inlet holes of the heating module 40 include a plurality of through holes 44a formed on a ceiling part of the shield case 44 and a plurality of through holes 42a formed on a ceiling part of the inner case 42. These through holes 42a and 44a enable cold air blown from the cooling fan 24, passing through the damper 26B, and flowing through a flow passage 12g to be introduced into the interior of the freezing/thawing chamber 12b.

The cold air outlet holes of the heating module 40 include a plurality of through holes 42b formed on a bottom part of the inner case 42 and a plurality of through holes 44b formed on a bottom part of the shield case 44. These through holes 42b and 44b enable cold air in the freezing/thawing chamber 12b to return the cooling chamber 12f.

Note that in the case of the present embodiment, cold air flowing out from the through holes 42b and 44b as the cold air outlet holes returns via the freezing chamber 12c to the cooling chamber 12f. For that reason, as shown in FIG. 6, on a partition part 12j of the main body 12 of the refrigerator 10 that partitions a space 12h in which the freezing/thawing chamber 12b is incorporated and the freezing chamber 12c, a through hole 12k is disposed that allows the space 12h and the freezing chamber 12c to communicate with each other.

Further, as shown in FIGS. 4 and 8, to ensure a smooth flow of cold air in the drawer 46 to the cooling chamber 12f (i.e. the freezing chamber 12c), it is preferred that the containing part 46a of the drawer 46 have, at least one of its bottom part and its lateral wall part, through holes 46c extending through from the inside of the drawer 46 toward the outside. In the case of the present embodiment, disposed as the through holes 41c are a plurality of slit holes 46c extending in the top-bottom direction on a back-side lateral wall part of the drawer 46 and juxtaposed in the left-right direction.

To thaw a food in a frozen state within the freezing/thawing chamber 12b, as shown in FIG. 2, the heating module 40 includes a heating unit 50.

Figure 9:
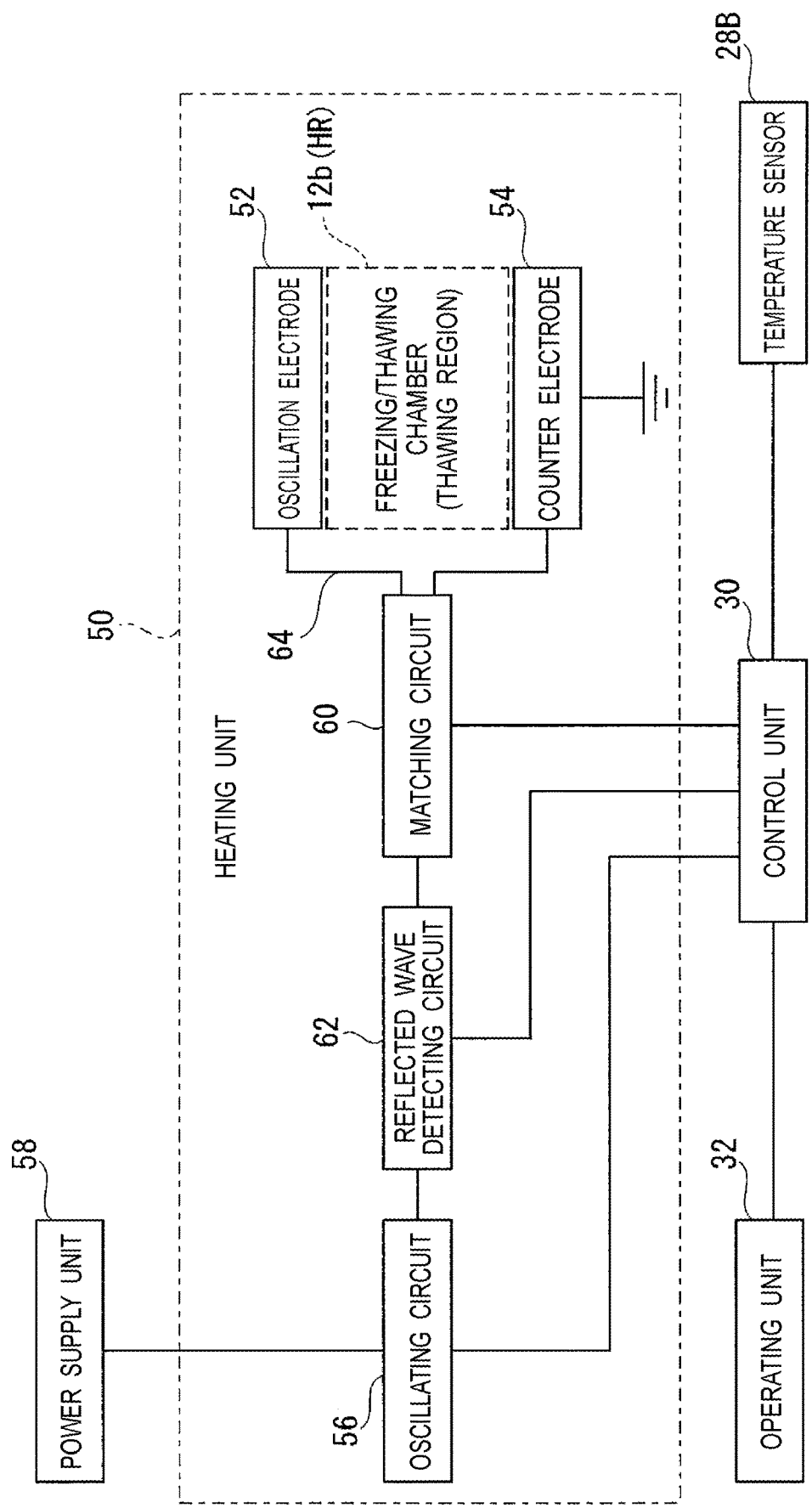
FIG. 9 is a block diagram showing a control system of a heating unit of the heating module.

FIG. 9 is a block diagram showing a control system of the heating unit of the heating module.

As shown in FIG. 5, the heating module 40 includes, as components of the heating unit 50, an oscillation electrode 52 and a counter electrode (counter electrode unit) 54 facing the oscillation electrode 52.

In the case of the present embodiment, the oscillation electrode 52 is a flat electrode made of a metal material as shown in FIG. 8 and is arranged in a space between the ceiling part of the inner case 42 and the ceiling part of the shield case 44 as shown in FIG. 5. Further, the oscillation electrode 52 has a plurality of cold air passage holes 52a through which cold air passes. By virtue of these cold air passage holes 52a, it is possible to cool the oscillation electrode 52 by cold air and to introduce cold air also into the region of the freezing/thawing chamber 12b located below the oscillation electrode 52.

In the case of the present embodiment, the counter electrode 54 is a portion 44c of the bottom part of the shield case 44. Further, the counter electrode 54 (portion 44c) faces the oscillation electrode 53 in the top-bottom direction with the inner case 42, i.e. the freezing/thawing chamber 12b in between. The oscillating electrode and the counter electrode need not have the same area.

The heating unit 50 includes, as shown in FIG. 9, an oscillating circuit (oscillating unit) 56 that is controlled by the control unit 30 to apply an AC voltage of a predetermined VHF band frequency e.g. of 40.68 MHz to between the oscillation electrode 52 and the counter electrode 54. Specifically, the oscillating circuit 56 is a circuit formed on a substrate and is electrically connected to the oscillation electrode 52 and the counter electrode 54. Further, the oscillating circuit 56 converts an AC voltage from a power supply unit 58 of the refrigerator 10 connected to a commercial power supply and applies the converted AC voltage to between the oscillation electrode 52 and the counter electrode 54.

When the AC voltage is applied, an alternating electric field occurs between the oscillating electrode 52 and the counter electrode 54. By this alternating electric field, a food placed between these electrodes 52 and 54 i.e. a food contained in the drawer 46 in the freezing/thawing chamber 12b is dielectrically heated. As a result, the food in the frozen state is thawed.

Note that in the case of the present embodiment, as shown in FIGS. 3 and 5, the oscillation electrode 52 and the counter electrode 54 are arranged so as to face each other with part of the freezing/thawing chamber 12b in between, instead of facing each other with the whole thereof in between. In consequence, the freezing/thawing chamber 12b is divided into a thawing zone (heating zone) DZ (region indicated by a broken line cross-hatching) that is a space where foods to be thawed (to be heated) are placed and a non-thawing zone (non-heating zone) NDZ that is a space continuous with the thawing zone DZ where foods not to be thawed (not to be heated) are placed. That is, between the oscillating electrode 52 and the counter electrode 54, the thawing zone DZ exists but the non-thawing zone NDZ does not exist.

By dividing the freezing/thawing chamber 12b into the thawing zone DZ and the non-thawing zone NDZ in this manner, only some of a plurality of foods contained in the freezing/thawing chamber 12b can be thawed. For this reason, when thawing, foods not desired to be thawed need not be moved from the freezing/thawing chamber 12, for example, to the freezing chamber 12c. Further, in the case where the operating unit 32 is configured so that the start time of thawing can be reserved, a food placed in the thawing zone DZ is kept frozen until thawing is started, and thereafter is automatically thawed as it is.

Further, in the case of the present embodiment, the thawing zone DZ lies on the front side of the refrigerator 10 with respect to the non-thawing zone NDZ. Therefore, the food thawed in the thawing zone DZ can be taken out immediately.

To indicate to the user to place the food to be thawed in this thawing zone DZ, it is preferred to dispose a presenting unit that presents to the user that the part of the drawer 46 arranged in the thawing zone DZ is the place where the food to be thawed is placed. The presenting unit may be, for example, an image or characters printed on the bottom surface of the drawer 46. Further, for example, the presenting unit may be a partition wall disposed in the drawer 46 that indicates a boundary between the thawing zone DZ and the non-thawing zone NDZ. Further, the front-back positional relationship between the thawing zone DZ and the non-thawing zone NDZ may be reversed. If reversed, the length of a connection member 64 is shortened and the heating efficiency is improved.

As shown in FIG. 8, when the oscillation electrode 52 and the counter electrode 54 are viewed in the direction facing each other (the top-bottom direction of the refrigerator 10), the oscillation electrode 52 and the counter electrode 54 are preferably positioned on the inner case 42 so as not to overlap the rails 48. Unlike this, in the case where the rails 48 are present between the oscillation electrode 52 and the counter electrode 54, an alternating electric field occurs between the oscillation electrode 52 and the rails 48, whereas the alternating electric field generated between the oscillation electrode 52 and the counter electrode 54 weakens, so that the uniformity of the electric field (uniformity of heating) is impaired.

Furthermore, in the case of the present embodiment, the counter electrode 54 is a raised portion of the shield case 44 that rises toward the oscillation electrode 52, with the result that the counter electrode 54 is close to the oscillation electrode 52. Thus, as compared with the case where the counter electrode 54 is not the raised portion, a stronger alternating electric field can be generated.

During thawing of a food, that is, when an alternating electric field occurs between the oscillation electrode 52 and the counter electrode 54, the shield case 44 functions as a shield member that shields this alternating electric field from leaking to the outside. Note that to prevent the alternating electric field from leaking to the outside through the opening on the front side of the shield case 44, as shown in FIG. 5, a metal shield plate 46d is disposed within the door part 46b of the drawer 46. The freezing/thawing chamber 12b generating an alternating electric field is surrounded by the shield plate 46d and the shield case 44 and is electromagnetically shielded.

As shown in FIG. 9, the heating unit 50 further includes a matching circuit (matching unit) 60 for impedance matching between the oscillation electrode 52 and the counter electrode 54. Specifically, the matching circuit 60 is a circuit formed on the substrate and is electrically connected to the oscillation electrode 52 and the counter electrode 54. In the case of the present embodiment, the counter electrode 54 is grounded.

The role of the matching circuit 60 will be described. As the thawing of a food progresses, the number of water molecules in the food increases. As the number of water molecules increases, the impedance changes from the matched state and the reflectance increases. Note that the reflectance is a ratio of the reflected wave returning to the oscillating circuit 56 to the incident wave output from the oscillating circuit 56.

Figure 10:
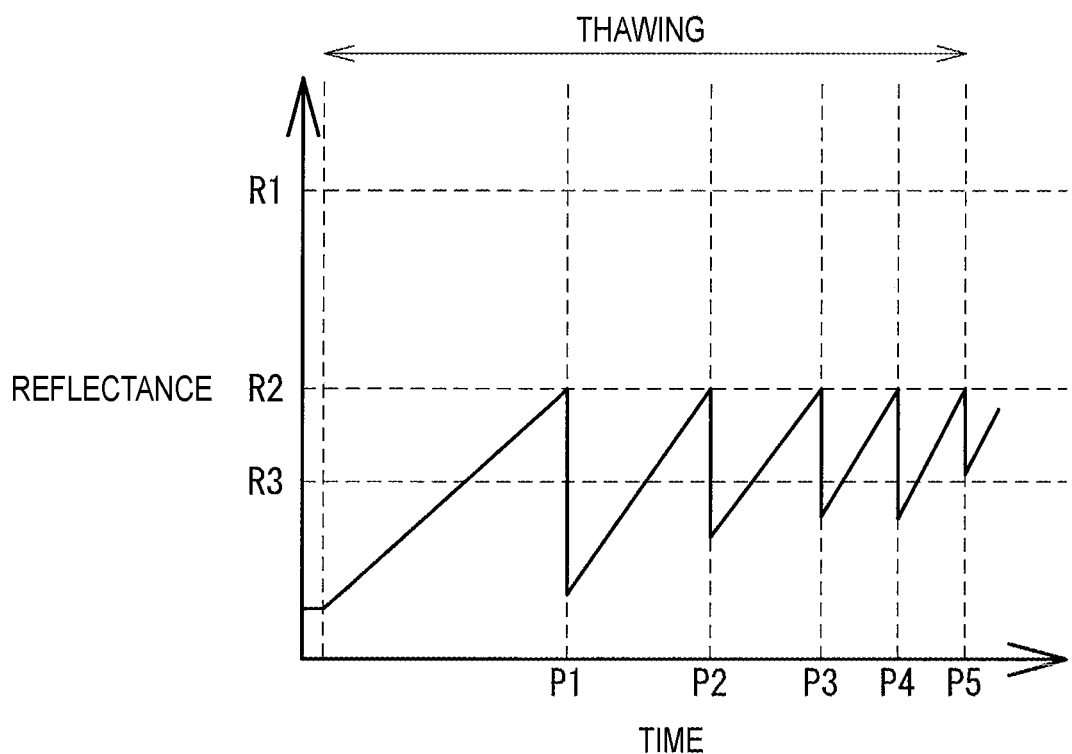
FIG. 10 is a diagram showing changes in reflectance during thawing of a food.

FIG. 10 is a diagram showing changes in reflectance during thawing of a food.

In FIG. 10, P1 to P5 are timings for the matching circuit 60 to re-match the impedance between the oscillation electrode 52 and the counter electrode 54. Further, R1 to R3 are threshold values of the reflectance. Further, in reality, instead of the reflectance, threshold values of the reflected power to be easily detected may be set for determination.

The reflectance increases over time as the food begins to thaw. Every time the reflectance reaches a second threshold value R2, the matching circuit 60 re-matches the impedance between the oscillation electrode 52 and the counter electrode 54. As a result, the reflectance decreases. In this manner, by repeatedly re-matching the impedance between the oscillation electrode 52 and the counter electrode 54 by the time when thawing of a food terminates, the food can be thawed efficiently while suppressing the loss of electrical energy due to reflection.

In order to calculate this reflectance, as shown in FIG. 9, the heating unit 50 includes a reflected wave detecting circuit 62. The control unit 30 as a reflectance calculating unit calculates the reflectance, based on the incident wave output from the oscillating circuit 56 and the reflected wave detected by the reflected wave detecting circuit 62. Every time the calculated reflectance reaches the second threshold value R2, the matching circuit 60 re-matches the impedance between the oscillation electrode 52 and the counter electrode 54.

In the case of the present embodiment, as shown in FIG. 5, the oscillating circuit 56, the matching circuit 60, and the reflected wave detecting circuit 62 are incorporated in the heating module 40. Note that the reflected wave detecting circuit 62 is formed on the substrate having on which the matching circuit 60 is formed.

Specifically, as shown in FIG. 5, the oscillating circuit 56 and the matching circuit 60 are arranged within a shield chamber 44d disposed in the shield case 44. This shield chamber 44d is isolated from the freezing/thawing chamber 12b by a partition wall 44e. By being arranged in such a shield chamber 44d, the oscillating circuit 56 and the matching circuit 60 are shielded from the alternating electric field generated in the freezing/thawing chamber 12b, and malfunction is suppressed.

Note that the connection member 64 electrically connecting the matching circuit 60 and the oscillation electrode 52 extends through the partition wall 44e. As shown in FIG. 8, the connection member 64 has a smaller size in the left-right direction than the oscillation electrode 52. This is for suppressing the generation of an alternating electric field between the connection member 64 and a portion of the shield case 44 that faces it with the freezing/thawing chamber 12b in between. That is, as shown in FIG. 3, it is for preventing foods present in the non-thawing zone NDZ located below the connection member 64 from being thawed.

Further, as shown in FIG. 5, on the oscillating circuit 56 there is disposed a connector 66 for connection with the control unit 30 of the refrigerator 10. Further, also on the matching circuit 60 there is disposed a connector 68 for connection with the control unit 30. As shown in FIG. 6, the connector 66 of the oscillating circuit 56 engages with a connector 70 that is disposed in the space 12h of the main body 12 of the refrigerator 10 in which the heating module 40 is incorporated and that is connected to the control unit 30. Further, in the same manner, the connector 68 of the matching circuit 60 engages with a connector 72 that is disposed in the space 12h and connected to the control unit 30. The work for engaging these connectors is performed via the through hole 12k that allows the space 12h and the freezing chamber 12c to communicate with each other. That is, as shown in FIG. 4, the through hole 12k allowing passage of cold air from the freezing/thawing chamber 12b toward the freezing chamber 12c functions as an access hole for access to the heating module 40.

The advantage of incorporating the oscillating circuit 56 and the matching circuit 60 (the reflected wave detecting circuit 62 included therein) together with the oscillation electrode 52 and the counter electrode 54 in the heating module 40 including the shield case 44, as in the present embodiment, is that a heating test, a noise (alternating electric field) leakage check, and other inspections of these can be performed outside the refrigerator 10.

Dissimilar to this, in case that the oscillation electrode, the counter electrode, the oscillating circuit, the matching circuit, the reflected wave detecting circuit, and the shield component are each incorporated in the interior of the refrigerator main body, the heating test, the noise leakage check, and other inspections need to be performed after incorporating all of these into the refrigerator main body. Therefore, for example, if the result of the heating test is not good or if noise leakage occurs, it is necessary to remove the circuits and shield component incorporated inside the refrigerator main body, which is very troublesome. Also, if noise leakage occurs, the shield member needs to be removed from the refrigerator main body. As a result, the refrigerator manufacturing work including inspections may become complicated.

Thus, by modularizing, as the heating module 40, the oscillation electrode 52, the counter electrode 54, the oscillating circuit 56, the matching circuit 60, the reflected wave detecting circuit 62, and the shield case 44 in this manner, the heating test, the noise leakage check, and other inspections can be performed outside the refrigerator 10, consequently facilitating the manufacture of the refrigerator 10. Further, in the case where the refrigerator housing is covered with a metal plate, the leakage noise may not be detected from outside of the refrigerator because it is shielded by the metal plate. In that case, the risk is overlooked that electronic components lying between the metal plate and the heating module 40 will not operate normally due to the effects of leak noise, rendering it impossible to perform quality verification as a refrigerator.

The configuration of the freezing/thawing chamber 12b has been described so far. Hereinafter, description will be given of the action (operation) for foods in the freezing/thawing chamber 12b of the refrigerator according to the present embodiment.

In the case of the present embodiment, for foods in the freezing/thawing chamber 12b, the control unit 30 executes a normal operation, a quenching operation, a zone thawing operation (zone heating operation), an all-zones thawing operation, and a slight-freezing operation.

The normal operation is an operation to maintain the temperature in the freezing/thawing chamber 12b at a freezing preservation temperature (first cooling preservation temperature) e.g. at a temperature of −16° C. to −20° C. that is a freezing temperature at which foods freeze, for preserving foods in the freezing/thawing chamber 12b in a frozen state. That is, it is the operation of maintaining the temperature at the same level as the freezing chamber 12c.

Figure 11:
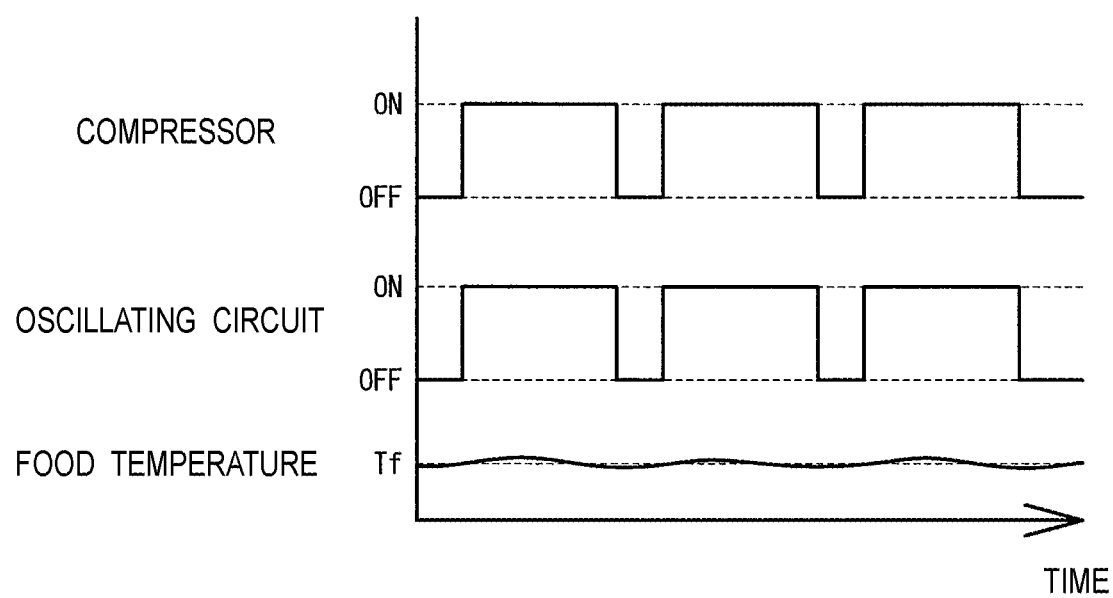
FIG. 11 is a timing chart of a normal operation.

FIG. 11 is a timing chart of the normal operation.

As shown in FIG. 11, in the normal operation, the compressor 20 is operated intermittently and the cooling fan 24 and the damper 26B are controlled so as to maintain the temperature in the freezing/thawing chamber 12b at a freezing preservation temperature Tf (so as to maintain the food temperature at Tf).

By such an intermittent operation of the compressor 20, the water content of a food evaporates when the compressor 20 is stopped (when it is OFF), while the food is frosted when the compressor 20 is operating (when it is ON), whereupon the food temperature fluctuates in a wide range.

When a food placed in the thawing zone DZ is frosted, part of food dries, causes a freezer burn, and deteriorates, and hence even if the thawing is performed with high quality, it is not possible to provide the user with a high quality food.

As a countermeasure, in the case of the present embodiment, when the compressor 20 is operating, the oscillating circuit 56 is turn ON to apply an AC voltage to between the oscillation electrode 52 and the counter electrode 54, whereas when the compressor 20 is stopped, the oscillating circuit 56 is turn OFF to stop applying AC voltage, to thereby reduce the food temperature fluctuations. The output of the oscillating circuit 56 at this time is, for example, 30% or more of the freezing capacity.

By such an intermittent operation (i.e. intermittent dielectric heating) of the oscillating circuit 56, the generation of frost on a food placed in the thawing zone DZ is suppressed, and as a result, the occurrence of variations in thawing quality is suppressed. In addition, the growth of ice crystals can be suppressed inside the food placed in the thawing zone DZ. When ice crystals grows to a large extent inside the food, cells and tissues of the food are damaged and water flows out from the damaged cells and tissues when thawed, resulting in deterioration of the food quality. As a countermeasure, dielectric heating is performed to allow electric fields to gather at the tips of ice crystals to suppress the crystal growth, so that the physical deterioration of the food can be suppressed through suppression of the ice crystal size.

The quenching operation is an operation for freezing (quenching) a food to be newly frozen from now on, more rapidly than in the normal operation when the food is placed in the thawing zone DZ of the freezing/thawing chamber 12b. Further, when the food is placed, the quenching operation is automatically started.

Figure 12:
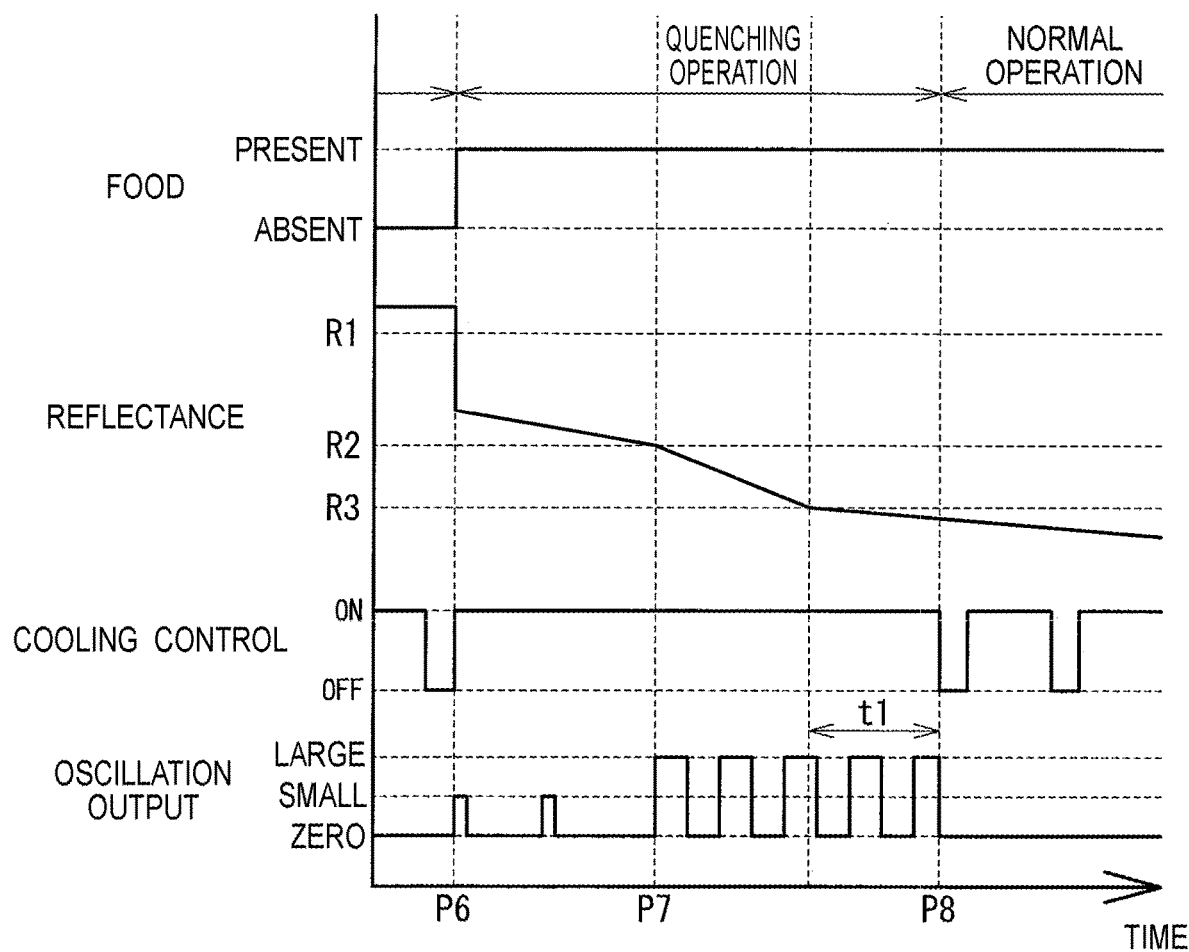
FIG. 12 is a timing chart of a quenching operation.

FIG. 12 is a timing chart of the quenching operation.

The reflectance described above is used to detect that a food to be quickly frozen from now on is placed in the thawing zone DZ of the freezing/thawing chamber 12b. As shown in FIG. 12, a signal of a door open/close switch is used as a trigger to weakly operate the oscillating circuit 56 (small oscillation output), and switch-on is determined by the reflectance. After the switch-on determination, the oscillating circuit 56 is periodically operated to detect a change in reflectance, and the frozen state is determined based on the detected change in reflectance, to control the operation of the oscillating circuit 56.

As shown in FIG. 12, a food to be quickly frozen from now on is placed in the thawing zone DZ of the freezing/thawing chamber 12b (timing P6), the reflectance decreases. This is because the permittivity between the oscillation electrode 52 and the counter electrode 54 increases due to the placement of the food to be quickly frozen between the oscillation electrode 52 and the counter electrode 54.

In the case of the present embodiment, when the reflectance drops beyond a first threshold value R1, the control unit 30 determines that a food to be quickly frozen from now on is placed in the thawing zone DZ of the freezing/thawing chamber 12b, to start the quenching operation instead of the normal operation (timing P6).

When the quenching operation is started, the cooling control is continuously executed as shown in FIG. 12. For example, the compressor 20 and the cooling fan 24 are continuously operated and the damper 26B is kept open. Note that, if there is spare capacity, the output of the compressor 20 and the rotation speed of the cooling fan 24 may be increased as compared with the normal operation.

As shown in FIG. 12, when the reflectance decreases and reaches a second threshold value R2, the rate of change of the reflectance increases. This is because the food temperature has entered a maximum ice crystal formation zone (e.g. −1° C. to −5° C.) where ice crystals are easy to grow.

When the food temperature enters the maximum ice crystal formation zone (when the reflectance reaches the second threshold value R2), the oscillating circuit 56 of the heating unit 50 starts to intermittently apply the AC voltage to between the oscillation electrode 52 and the counter electrode 54. At this time, the output of the oscillating circuit 56 is, for example, 1 W to 10 W, which is smaller than the output in the normal operation. Such dielectric heating by the heating unit 50 enables a food to be frozen while suppressing the growth of ice crystals within the food.

As the reflectance further lowers to reach a third threshold value R3, the rate of change in reflectance decreases. This is because the food temperature has reached a temperature immediately before passing through the maximum ice crystal formation zone. When a predetermined time t1 elapses after reaching the third threshold value R3, the control unit 30 determines that the food temperature has passed through the maximum ice crystal formation zone, allowing the cooling control to return to the control in the normal operation, to terminate the intermittent application of the AC voltage by the oscillating circuit 56 (timing P8). As a result, the quenching operation terminates and the normal operation is resumed.

The zone thawing operation (zone heating operation) is an operation thawing (heating) only foods placed in the thawing zone DZ but maintaining foods placed in the non-thawing zone NDZ at the freezing preservation temperature Tf. Different from quenching operation, the zone thawing operation is started when the operating unit 32 receives a user's instruction to switch from normal operation to the zone thawing operation. For example, when the user presses a "zone thawing" button on the operating unit 32, the zone thawing operation is started.

Figure 13:
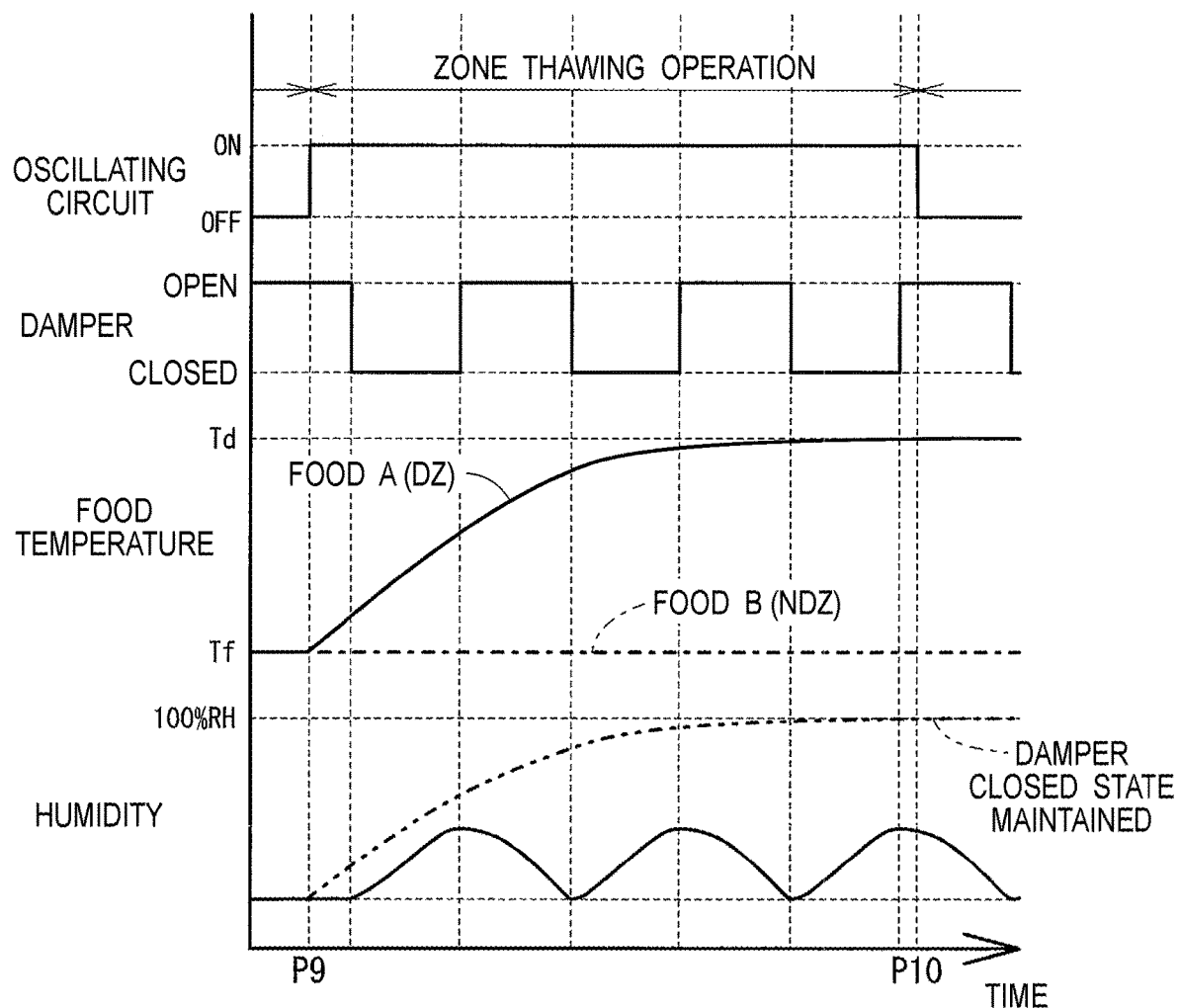
FIG. 13 is a timing chart of a zone thawing operation.

FIG. 13 is a timing chart of the zone thawing operation.

As shown in FIG. 13, when the zone thawing operation is started, the oscillating circuit 56 of the heating unit 50 starts to continuously apply the AC voltage to between the oscillation electrode 52 and the counter electrode 54. As a result, thawing of a food A placed in the thawing zone DZ begins and the temperature of the food A begins to rise.

On the other hand, the output of the compressor 20, the rotation speed of the cooling fan 24, and the opening and closing of the damper 26B are controlled so as to maintain a food B placed in the non-freezing zone NDZ at the freezing preservation temperature Tf, that is, so as to maintain the freezing/thawing chamber 12b at the freezing preservation temperature Tf in the normal operation. For example, the damper 26B repeats opening and closing so that the open state and the closed state continue for the same time.

In consequence, the food B placed in the non-thawing zone NDZ is preserved frozen as in the normal operation. In the case of this zone thawing operation, considering the temperature rise in the freezing/thawing chamber 12b caused by the dielectric heating by the heating unit 50, the output of the compressor 20 and the rotation speed of the cooling fan 24 are higher and the opening time of the damper 26B is longer than in the normal operation.

Further, according to such a zone thawing operation, water vapor generated from the food A being thawed is discharged to the outside of the freezing/thawing chamber 12b by intermittently opening the damper 26B. As a result, the relative humidity of the cooling/thawing chamber 12b does not reach 100% and the generation of frost is suppressed.

When the thawing of the food A placed in the thawing zone DZ is completed, the zone thawing operation terminates.

Note that in the case of the present embodiment, the completion of thawing of a food is determined based on the change in reflectance.

As seen in FIG. 10 indicating the change in reflectance during thawing of a food, according as the thawing progresses, the reflectance immediately after impedance matching gradually increases. For example, the reflectance at the timing P2 is higher than the reflectance at the timing P1. At the timing 5, unlike the timings P1 to P4 before that, the reflectance after impedance matching has a higher value than the third threshold value R3. By appropriately setting this third threshold value R3, if the reflectance lowered by impedance matching is higher than the third threshold value R3, the impedance matching execution timing P5 can be regarded as the thawing completion timing. Accordingly, if the reflectance does not drop beyond the third threshold value by impedance matching, the control unit 30 determines that the thawing of a food has been completed at the execution timing of the impedance matching, to terminate the zone thawing operation. When the zone thawing operation terminates, the normal operation is resumed. However, depending on the amount and physical characteristics of the food, even if not thawed, the reflectance after matching may exceed R3, and even if thawed, it may not reach R2. Therefore, the minimum operation time and the maximum operation time may be set regardless of the threshold values R2 and R3.

The all-zones thawing operation is an operation of thawing (heating) all of foods, that is, not only foods in the thawing zone DZ but also foods in the non-thawing zone NDZ, in the freezing/thawing chamber 12b. Similar to the zone thawing operation, the all-zones thawing operation is also started when the operating unit 32 receives a user's instruction to switch from the normal operation to the all-zones thawing operation. For example, when the user presses an "all-zones thawing" button on the operating unit 32, the all-zones thawing operation is started.

Figure 14:
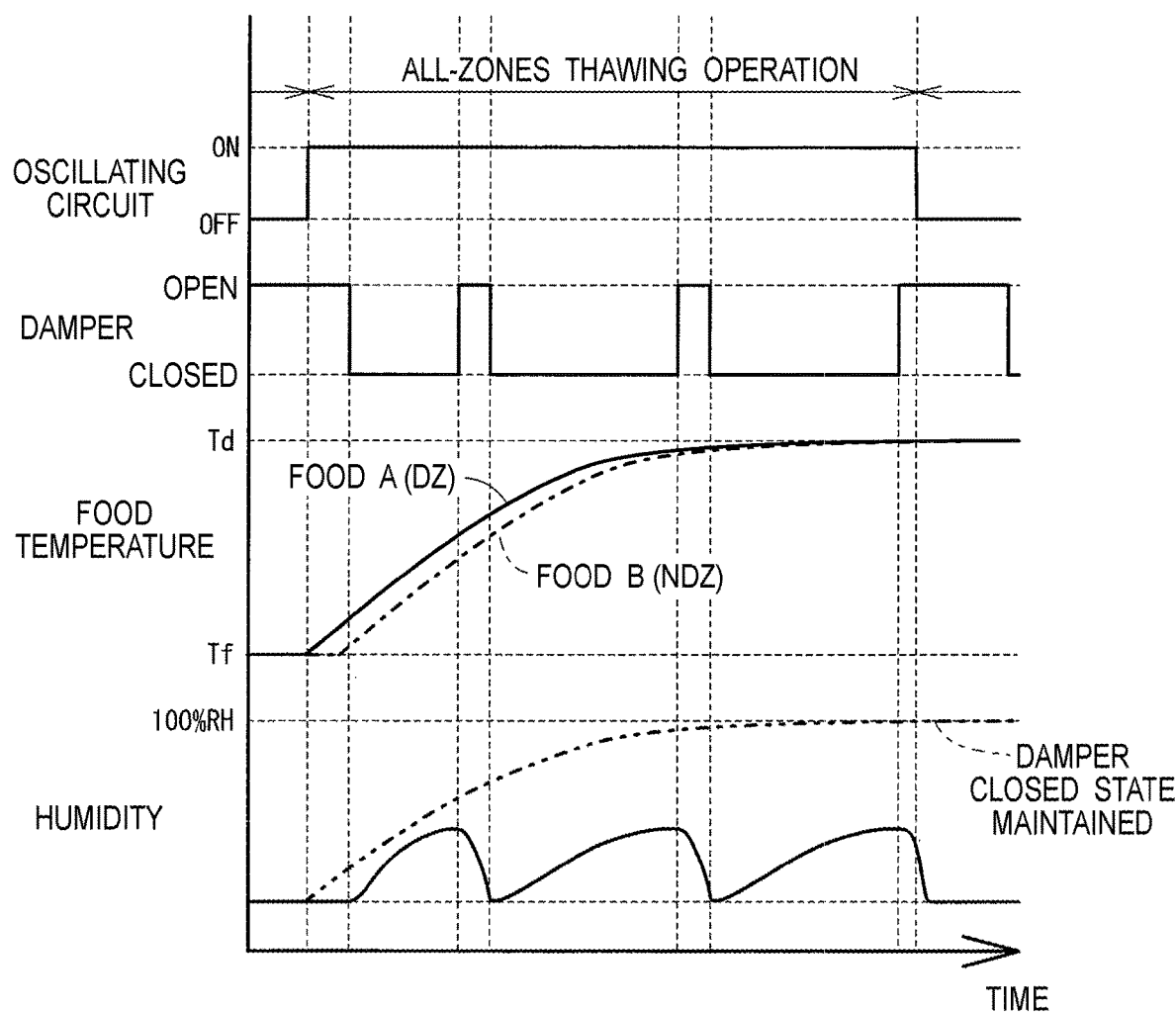
FIG. 14 is a timing chart of an all-zones thawing operation.

FIG. 14 is a timing chart of the all-zones thawing operation.

As shown in FIG. 14, the all-zones thawing operation is the same as the zone thawing operation shown in FIG. 12 except for the opening time of the damper 26B. Specifically, during the all-zones thawing operation, the damper 26B is almost closed to maintain the temperature of the freezing/thawing chamber 12b that rises due to the dielectric heating of the heating unit 50. However, to reduce the humidity in the freezing/thawing chamber 12b to suppress the generation of frost, the damper 26B opens momentarily to discharge water vapor to the outside. Such an all-zones thawing operation thaws all of foods in the freezing/thawing chamber 12b. The all-zones thawing operation terminates in the same manner as the zone thawing operation. After the termination thereof, the ordinary operation is resumed.

The slight-freezing operation is an operation executed when the food after thawing (thawed food) is left as it is without being removed from the freezing/thawing chamber 12b.

When the thawed food thawed by the zone thawing operation or the all-zones thawing operation is left intact, it is frozen again by the subsequent normal operation. Therefore, the user may remove the thawed food from the freezing/thawing chamber 12b in a re-frozen state. Naturally, the food is hard because it is in a re-frozen state and the user cannot cook it immediately. As a countermeasure, it is conceivable to maintain the temperature of the thawed food at a temperature where it does not freeze after the completion of thawing, but in that case, if left for a long time, the thawed food may be damaged.

Thus, in the case of the present embodiment, the slight-freezing operation is executed that, if the thawed food is left as it is without being removed from the freezing/thawing chamber 12b, maintains the thawed food in a slightly-frozen state, that is, maintains it at a slight-freezing temperature (e.g. −3° C. to −7° C.) higher than the freezing preservation temperature (−16° C. to −20° C.). The "slightly-frozen state" referred to herein means a state where the intracellular liquid of a food does not freeze, but the extracellular liquid freezes.

Note that the slight-freezing operation (zone slight-freezing operation) performed after the zone thawing operation and the slight-freezing operation (all-zones slight-freezing operation) performed after the all-zones thawing operation have different contents.

The zone slight-freezing operation is executed after the zone thawing operation. This operation is an operation that heats a thawed food in the thawing zone DZ by the heating unit 50 so that the temperature thereof is maintained at the slight-freezing temperature while the temperature in the freezing/thawing chamber 12b is maintained at the freezing preservation temperature. As a result, foods in the non-thawing zone NDZ are maintained at the freezing preservation temperature in the same manner as in the normal operation while the frozen food in the thawing zone DZ is maintained at the slight-freezing temperature.

The all-zones slight-freezing operation is executed after the all-zones thawing operation. This operation is an operation that maintains the temperature in the freezing/thawing chamber 12b at the slight-freezing temperature with the heating unit 50 stopped. As a result, the thawed food in the freezing/thawing chamber 12b is maintained at the slight-freezing temperature.

To execute the zone and all-zones slight-freezing operations, a thawed food detecting unit is needed that detects, after the completion of thawing, whether or not a thawed food is present in the freezing/thawing chamber 12b.

In the case of the present embodiment, the presence of a thawed food is detected using the above-described reflectance. That is, the reflected wave detecting circuit 62 detecting a reflected wave and the control unit 30 calculating the reflectance based on the detected reflected wave function as the thawed food detecting unit.

Specifically, as described in the quenching operation, when a food to be frozen from now on is placed in the thawing zone DZ, the reflectance drops beyond the first threshold value R1. From the opposite point of view, the reflectance increases beyond the first threshold value R1 when the thawed food is removed from the thawing zone DZ. Accordingly, if the reflectance rises beyond the first threshold value R1, it can be determined that the thawed food thawed by the zone thawing operation has been removed from the thawing zone DZ. Or, it can be determined that the food thawed by the all-zones thawing operation has been removed from the thawing zone D and the non-thawing zone NDZ.

When the presence of the thawed food is detected in the freezing/thawing chamber 12b after the completion of thawing, the zone or all-zones slight-freezing operation is executed. If the presence of the food is not detected, the normal operation is executed.

As an alternative, the presence of the thawed food may be detected by a door sensor 34 that detects opening and closing of the door (door part 46b of the drawer 46) of the freezing/thawing chamber 12b, as shown in FIG. 3.

The user needs to open the door to remove the thawed food from the freezing/thawing chamber 12b. Therefore, if the door sensor 34 does not detect opening of the door after thawing is completed, it can be determined that the thawed food is present in the freezing/thawing chamber 12b.

Further details of the zone slight-freezing operation and the all-zones slight-freezing operation will be described using a flowchart shown in FIG. 15.

Figure 15:
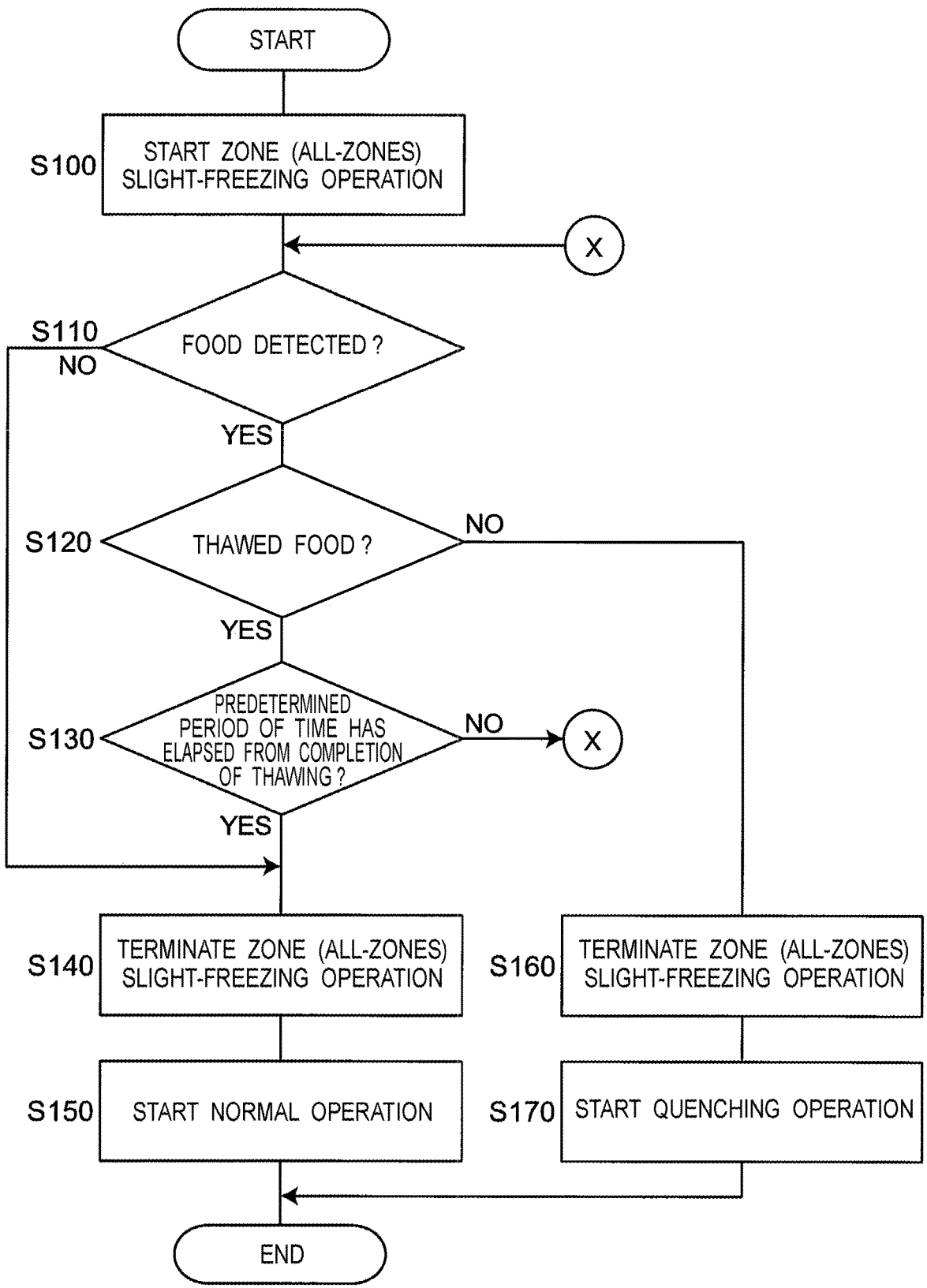
FIG. 15 is a flowchart of the zone thawing operation (all-zones thawing operation).

As shown in FIG. 15, first, when the zone (all-zones) thawing operation terminates, the control unit 30 starts the zone (all-zones) slight-freezing operation at step S100.

At step S110, the control unit 30 determines whether or not a food is present in the freezing/thawing chamber 12b. If present, the process proceeds to step S120. If not, the process proceeds to step S140.

At step S120, the control unit 30 determines whether or not the food detected at step S110 is a thawed food. This is because the food detected at step S110 may be a food contained in the freezing/thawing chamber 12b to be frozen from now on. However, if the food detected at step S110 is a food to be frozen from now on, the door of the freezing/thawing chamber 12b is opened by the user after thawing is completed. That is, the door sensor 34 detects opening of the door after thawing is completed. Accordingly, if the door sensor 34 does not detect opening of the door, it is determined that the food detected at step S110 is a thawed food, allowing the process to proceed to step S130. If not, it is determined that the food detected at step S110 is a food to be frozen from now on, allowing the process to proceed to step S160 where the zone (all-zones) slight-freezing operation is terminated, to start the quenching operation at step S170 that follows.

If determined as the thawed food at step S120, the control unit 30 determines at step S130 whether or not a predetermined period of time has elapsed from the completion of thawing. This is because the quality of thawed foods deteriorates when it is preserved in a slightly frozen state for a long period of time. In the case of the all-zones thawing operation, the predetermined period of time is 7 days for example. In the case of the zone thawing operation, frost occurs more easily as compared with the all-zones thawing operation, so the predetermined period of time is 5 days that is shorter than in the all-zones thawing operation. If the predetermined period of time has elapsed from the completion of thawing, the process proceeds to step S140 to terminate the zone (all-zones) slight-freezing operation, to thereafter start the normal operation at step S150 that follows. If the predetermined period of time has not elapsed, the process returns to step S110.

As described above, according to the present embodiment, it is possible, in the refrigerator including the freezing/thawing chamber capable of freezing and thawing foods, to thaw foods in the freezing/thawing chamber without moving foods other than the foods to be thawed from the freezing/thawing chamber.

Hereinabove, the present invention has been described while referring to the above-described embodiment, but the present invention is not limited to the above-described embodiment.

For example, although in the case of the above-described embodiment, the components thawing foods such as the oscillation electrode, counter electrode, and oscillating unit (oscillating circuit) are modularized as a single module, it is also possible to incorporate each into the main body of the refrigerator separately.

Further, in the case of the above-described embodiment, as shown in FIG. 4, the containing chamber of the heating module 40 functions as the freezing/thawing chamber 12b capable of freezing and thawing by introducing cold air. However, the embodiment of the present invention is not limited thereto. The heating module may not introduce cold air into its containment chamber, i.e., it may be dedicated to thawing. Then, the heating module 40 may be used not only for freezing and thawing and but also for cooling and heating foods as a temperature control. That is, the containing chamber of the heating module 40 may be the cooling/heating chamber.

Furthermore, although in the above-described embodiment, description has been given mainly to an example of heating and thawing in the freezing chamber, heating may be performed in a chamber in another temperature range in the refrigerator. For example, it is also possible to promote fermentation to make homemade yogurt, homemade natto, etc. by heating milk with yogurt bacteria and soybeans with natto bacteria.

Then, it will be apparent to those skilled in the art to totally or partially combine at least part of an embodiment with at least another embodiment into a further embodiment according to the present invention.

As above, the embodiment has been described as an exemplification of the technique in the present disclosure. To that end, the accompanying drawings and detailed description have been provided. Therefore, the components described in the accompanying drawings and the detailed description may include not only components essential for solving the problem but also components not essential for solving the problem to exemplify the technique. Accordingly, immediately from the fact that those non-essential components are described in the accompanying drawings and the detailed description, those non-essential components should not be recognized as being essential.

Moreover, since the above-described embodiment is for exemplifying the technique in the present disclosure, various changes, replacements, additions, omissions, etc. can be made within the scope of claims and equivalents thereof.

Contents of disclosure of the specification, drawings, and claims of Japanese Patent Application No. 2018-199431 filed on Oct. 23, 2018 are incorporated herein by reference in their entirety.

INDUSTRIAL APPLICABILITY

The present invention is applicable to a refrigerator having a heating function.

The invention claimed is:

1. A refrigerator having a cooling/heating chamber capable of cooling and heating foods,
    the cooling/heating chamber being divided into a heating zone that is a space where foods to be heated are placed, and a non-heating zone that is a space continuous with the heating zone where foods not to be heated are placed, the refrigerator comprising:
    an oscillation electrode arranged on a ceiling part of the heating zone,
    a counter electrode arranged on a bottom part of the heating zone so as to face the oscillation electrode in a top-bottom direction, and
    an oscillating unit that applies an AC voltage to between the oscillation electrode and the counter electrode during execution of a zone heating operation,
    wherein the cooling/heating chamber is defined by an inner case made of an insulating material, and
    the oscillation electrode is outside of the inner case.

2. The refrigerator of claim 1, comprising:
    an operating unit that receives a user's instruction to switch from a normal operation preserving the foods at a first cooling preservation temperature to the zone heating operation heating foods placed in the heating zone.

3. The refrigerator of claim 2, wherein
    the first cooling preservation temperature is a freezing temperature.

4. The refrigerator of claim 1, wherein
    the oscillation electrode has a cold air passage hole through which the cold air passes toward the cooling/heating chamber.

5. The refrigerator of claim 1, comprising:
    a drawer containing the foods that retreats from and enter the cooling/heating chamber, and
    a presenting unit that presents to a user that a portion of the drawer arranged in the heating zone is a place where foods to be heated are placed.

6. The refrigerator of claim 5, wherein
the drawer has, on at least one of a bottom part and a lateral wall part of the drawer, a through hole extending through from the interior of the drawer toward the exterior.

7. The refrigerator of claim 1, wherein
the heating zone is located in front of the refrigerator with respect to the non-heating zone.

8. The refrigerator of claim 1, comprising:
a compressor that circulates a refrigerant;
a cooler through which the refrigerant passes;
a cooling fan that blows cold air, which is air cooled by the cooler, toward the cooling/heating chamber;
a damper that is disposed on a flow passage between the cooling/heating chamber and the cooling fan, for controlling a flow rate of cold air flowing into the cooling/heating chamber by opening and closing; and
a temperature sensor that measures an internal temperature of the cooling/heating chamber, wherein
during the zone heating operation, the internal temperature of the cooling/heating chamber is maintained at the first cooling preservation temperature that is the temperature in the normal operation, by executing output control of the compressor, rotation speed control of the cooling fan, and opening/closing control of the damper, based on a result of measurement by the temperature sensor.

9. The refrigerator of claim 8, wherein
the first cooling preservation temperature is a freezing temperature.

10. The refrigerator of claim 1, comprising:
a reflected wave detecting unit that detects a reflected wave returning to the oscillating unit; and
a reflectance calculating unit that calculates a reflectance which is a ratio of the reflected wave to an incident wave output from the oscillating unit, wherein
at a first timing where a reflectance lower than a first threshold value is calculated, the operation is switched from the normal operation to a quenching operation that more rapidly cools the cooling/heating chamber than during the normal operation, wherein
at a second timing after the start of the quenching operation where the reflectance reaches a second threshold value that is a value lower than the first threshold value, the oscillating unit starts to intermittently apply an AC voltage to between the oscillation electrode and the counter electrode, and wherein
when a predetermined time elapses from a third timing after the oscillating unit starts to intermittently apply the AC voltage where the reflectance reaches a third threshold value that is a value lower than the second threshold value, the quenching operation terminates, with the result that the normal operation is resumed and the intermittent application of the AC voltage by the oscillating unit terminates.

11. The refrigerator of claim 1, wherein
when the compressor is operating during the normal operation, the oscillating unit applies an AC voltage to between the oscillation electrode and the counter electrode.

* * * * *